United States Patent [19]
Chen et al.

[11] Patent Number: 5,889,625
[45] Date of Patent: Mar. 30, 1999

[54] CHROMATIC ABERRATION CORRECTION FOR DISPLAY SYSTEMS

[75] Inventors: Chungte W. Chen, Irvine, Calif.; Roger E. Yaffe, Reston, Va.; Kris E. Bentley, Dallas, Tex.

[73] Assignee: Raytheon Company, Lexington, Mass.

[21] Appl. No.: 861,143

[22] Filed: May 21, 1997

[51] Int. Cl.$^6$ .............................. G02B 27/14; H04N 9/28
[52] U.S. Cl. ............................................ 359/637; 348/807
[58] Field of Search .................................. 359/637, 634; 348/806, 807

[56] References Cited

U.S. PATENT DOCUMENTS

| | | | |
|---|---|---|---|
| 5,004,331 | 4/1991 | Haseltine et al. | 359/728 |
| 5,369,450 | 11/1994 | Haseltine et al. | 348/745 |
| 5,499,139 | 3/1996 | Chen et al. | 359/649 |
| 5,537,253 | 7/1996 | Cox et al. | 359/630 |

OTHER PUBLICATIONS

"Field–Sequential Color Takes Another Step," by Christopher Sherman, Information Display, Mar. 1995, at pp. 12–15.

*Primary Examiner*—Georgia Epps
*Assistant Examiner*—Ricky Mack

[57] ABSTRACT

A full color display optical system with chromatic aberration correction. The system includes a wide spectral band image source such as a cathode ray tube or Ferroelectric liquid crystal array, a field sequential Red-Green-Blue shutter, and an optical module for projection. The optical module corrects longitudinal chromatic aberration and higher order monochromatic and chromatic aberrations. Lateral chromatic aberration and chromatic distortion are compensated electronically by the color sequential shutter and the image source with a pre-distorted image.

13 Claims, 2 Drawing Sheets

DISTORTION
PATTERN
AT IMAGE SOURCE

VIRTUAL IMAGE

CHROMATIC ABERRATION CORRECTION FOR DISPLAY SYSTEMS

TECHNICAL FIELD OF THE INVENTION

The invention relates to full color display optical systems, and more particularly to display systems employing electronic chromatic aberration correction.

BACKGROUND OF THE INVENTION

Optical systems which include lenses have aberrations, which result from the variation of the index of refraction of the lens material, e.g. glass, with respect to wavelength. There are four basic types of chromatic aberrations, i.e. longitudinal, lateral, higher order chromatic aberrations and chromatic distortion. The longitudinal chromatic aberration causes different colors forming sharp images in the different image planes. Lateral chromatic aberration causes different colors having different magnifications. Chromatic distortion is the variation of distortion with respect to wavelength, and is sometimes referred to as the high order lateral chromatic aberration. Higher order chromatic aberrations are the variation of higher order aberrations (such as spherical aberration, coma and astigmatism) with respect to different colors. Higher order chromatic aberrations can not be corrected by re-focusing.

The complexity of most of the full color visible optical systems is very often determined by the degree of the required residual chromatic aberration correction. In many cases, one arc minute of residual lateral chromatic aberration, the human eye limiting resolution, is often the specification. Unfortunately, it is a very demanding requirement.

The chromatic aberration correction of a typical optical system is generally accomplished through optical apparatus. Therefore, the chromatic aberration correction processes are accomplished with a combination of judicious glass selection and adding more lenses to the optical system. Unfortunately, many optical systems end up with a very complex design form and employing very expensive glass materials in order to meet the image quality specification. One exemplary system employing optical chromatic distortion correction is shown in U.S. Pat. No. 5,004,331, where an exotic glass material, LGSK2, is used to reduce chromatic aberration.

It would therefore be advantageous to provide a simplified full color display system with chromatic aberration correction by electronic apparatus.

SUMMARY OF THE INVENTION

A color optical display system with chromatic aberration correction is described. The system includes a wide spectral band image source for generating an image for display, such as a cathode ray tube or ferroelectric liquid crystal display. A color sequential shutter divides an image frame period of the image source into three sub-frame intervals, a first interval for passing a first color image component comprising the image to be projected, a second interval for passing a second color image component comprising the image to be projected, and a third sub-frame interval for passing a third color image component comprising the image to be projected. The image source and color sequential shutter comprise an apparatus for lateral chromatic aberration and chromatic distortion compensation. The system further includes a projection optical module, which is adapted to correct for longitudinal chromatic aberration and higher order monochromatic and chromatic aberrations. The shutter is typically interposed in the optical path between the image source and the projection optical module. The system electronically compensates for lateral chromatic aberration and chromatic distortion with a pre-distorted image. Because the optical elements of the system need not correct for lateral aberration and chromatic distortion, the optical system can be greatly simplified, while producing high quality imagery.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

An optical system embodying the invention includes three modules, a color sequential shutter, a wide spectral band image source such as a cathode ray tube (CRT) or a Ferroelectric liquid crystal (FLC) array, and an optical module for projection. The optical module is designed with the emphasis in correcting longitudinal chromatic aberration and higher order monochromatic and chromatic aberrations such as spherical aberrations, coma, astigmatism, spherochromatism, chromatic coma and chromatic astigmatism. The lateral chromatic aberration and chromatic distortion are compensated through the combination of a color sequential shutter and an image source such as a CRT with a pre-distorted image. Since it does not have to correct for lateral chromatic aberration and chromatic distortion, an optical system constructed according to an aspect of this invention can be greatly simplified. Additionally the image quality is improved.

Figure 1:
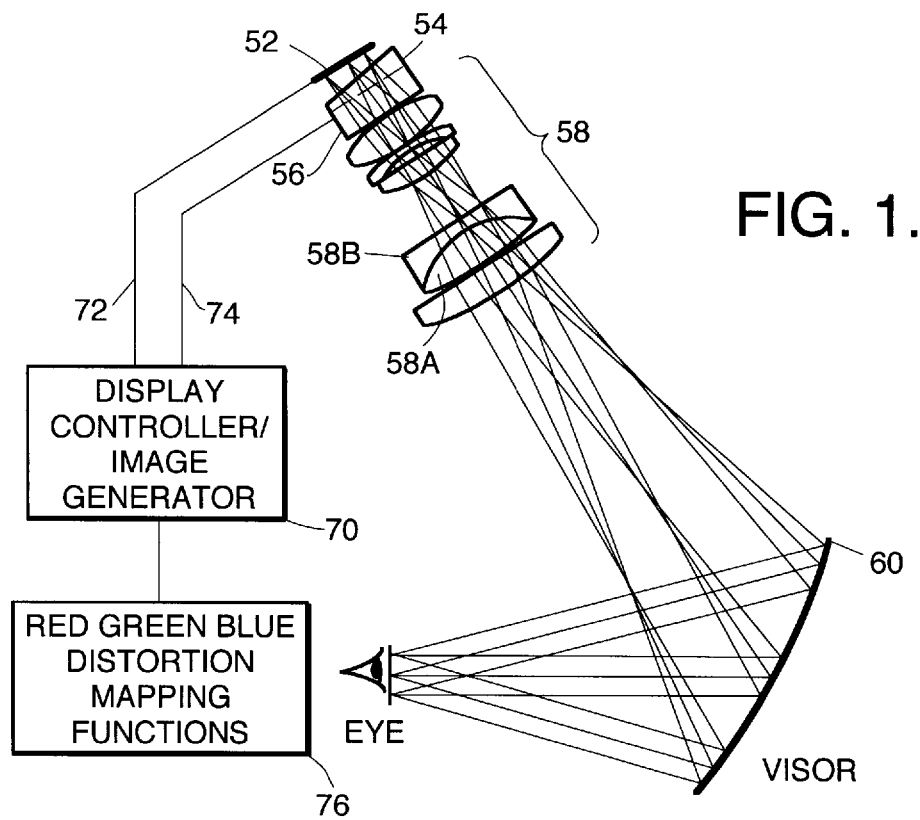
FIG. 1 is a side view of a helmet mounted optical display system according to the invention.

FIG. 1 is a side view of a full color helmet mounted display system 50 embodying the invention, which results in a simplified relay lens. The system 50 includes an image source 52 which generates images to be projected to the helmet wearer's eyes. A wedge-shaped transparent plate 54 is disposed between the image source and a color sequential shutter 56. The image produced by the source 52 is passed through the wedge 54 and the shutter 56 to the optical relay module 58. In this exemplary embodiment, the module 58 is a six element relay for relaying the image to the display visor 60 for reflection onto the helmet wearer's eye. In this exemplary embodiment, the visor 60 is an off-axis aspheric visor. Thus, the relay module 58 projects the image produced by the source 52 onto the focal plane of the visor 60, and the visor further projects the image to the viewer's eye. The visor 60 can be opaque for simulation purposes, or see-through to permit the wearer to view external images as well as the images produced by the display system.

The wedge-shaped plate 54 is used to correct axial coma due to the asymmetric arrangement of the relay module 58 with respect to the visor 60.

In this example, the color sequential shutter 56 and the image source 52 are electronically controlled by the display controller/image generator 70 via control lines 72, 74. The controller 70 has access to three different distortion mapping functions 76 corresponding to three different colors, used for lateral chromatic aberration and chromatic distortion corrections, which are often two of the most difficult aberrations to correct. Without the burden of correcting the lateral chromatic aberration, the higher order aberrations of the HMD can be compensated more easily by the optical module 58.

Figure 2:
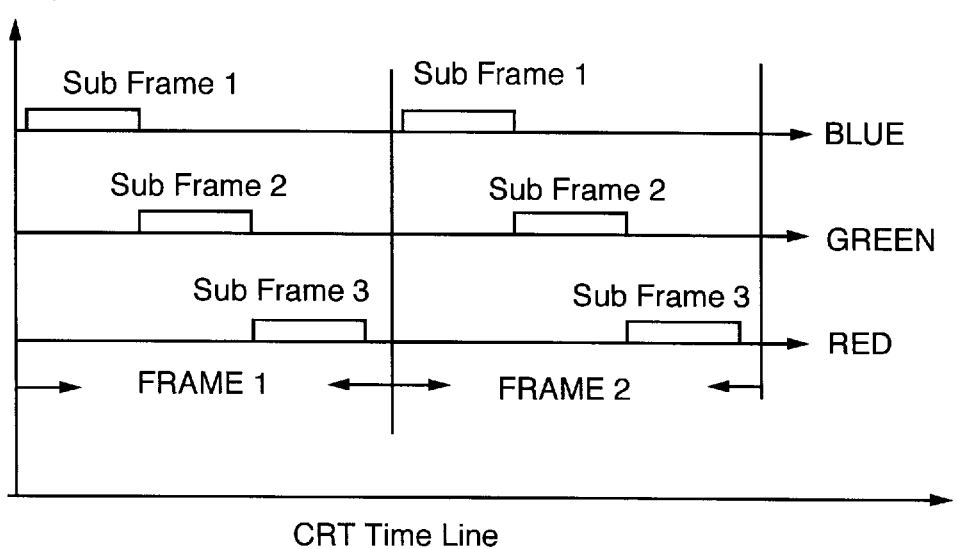
FIG. 2 is a time line chart illustrating the operation of the color sequential shutter of the system of FIG. 1.

The use of a color sequential shutter makes it possible to simplify a full color projection system, where it divides a typical frame time into three sub-frame times. Color sequential shutters suitable for the purpose are commercially available. One such device is the ferroelectric liquid crystal color shutter device marketed by Displaytec, Incorporated, Boulder, Colo., as the "fast-FILTER" (TM) device, controlled with a Displaytech DR50 FLC driver, as described in "Field-Sequential Color Takes Another Step," by Christopher Sherman, Information Display, March 1995, at pages 12–15. As shown in FIG. 2, the blue, green and red are turned on at sub-frames 1, 2 and 3, respectively; i.e. the color shutter transmits only blue during sub-frame 1, only green during sub-frame 2, and only red during sub-frame 3. Therefore, the full color image source 52 is equivalent to time-sharing three separate image sources. The optical system only requires a good image for each individual color when their corresponding shutter is turned on, i.e. during the respective sub-frame when that color is transmitted by the shutter. Since the color shutter only transmits one color at a given time, the controller can either operate the image source 52 to generate one color at a time, or generate a full color image.

In an exemplary application, for a helmet mounted display, the image frame time is 0.017 seconds, divided equally into three sub-intervals of 0.0056 seconds.

If a projection optical system is distortion free, a square grid test pattern originated from the image source 52 will project as a similar square grid image. Unfortunately, most optical systems have distortion. Therefore, the grid lines of the square grid pattern are generally curved due to distortion. Moreover, different colors will have different amounts of distortion, which is chromatic distortion.

Figure 3:
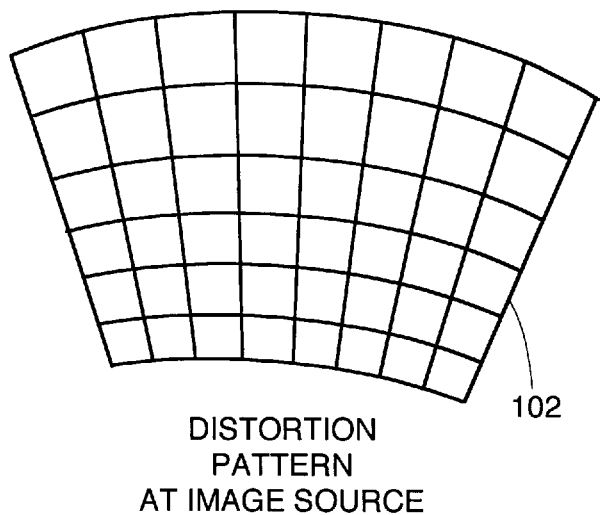
FIG. 3 illustrates an exemplary pre-distorted image pattern generated by the image source comprising the system of FIG. 1.
Figure 4:
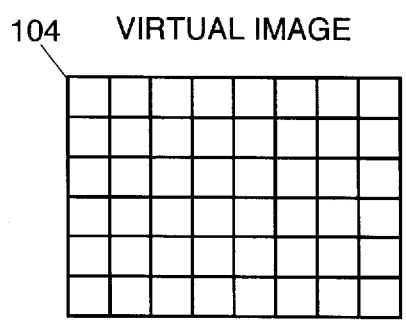
FIG. 4, illustrates an exemplary virtual image displayed to the observer by the system of FIG. 1, resulted from the pre-distorted image of FIG. 3.

The lateral chromatic aberration and chromatic distortion of the optical system associated with each color are compensated by a pre-distorting image on the image source 52. Thus, for example, instead of generating a square grid pattern, the image source 52 would in this case generate a curved grid pattern, such as pre-distorted pattern 102 shown in FIG. 3, such that due to the distortion a perfect square grid image, such as the virtual image 104 shown in FIG. 4, is projected. The image source 52 requires three different distortion mapping functions corresponding to three different colors. Thus, in operation, the display controller generates image signals which represents the pre-distorted images needed to electronically compensate for the lateral chromatic aberration and chromatic distortion, using the distortion mapping functions to map the undistorted image into the pre-distorted image.

The longitudinal chromatic aberration is corrected, in the conventional manner, through the use of the combination of crown and flint glasses in the projection optical module 58. For example, the module 58 includes an achromatic doublet comprising a positive lens 58A, fabricated from a crown glass such as BK7, and a negative lens 58B, fabricated of a flint glass such as F2. Crown glass is typically about two to three times less dispersive than a flint glass.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A color optical display system with chromatic aberration correction, comprising:

a wide spectral band image source for generating an image for display;

a color sequential shutter for dividing an image frame period into three sub-frame intervals, a first interval for passing a first color image component comprising the image to be projected, a second interval for passing a second color image component comprising the image to be projected, and a third sub-frame interval for passing a third color image component comprising the image to be projected, said image source and said color sequential shutter comprising an apparatus for lateral chromatic aberration and chromatic distortion compensation; and a projection optical module adapted to provide correction for longitudinal chromatic aberration, and wherein said projection optical module does not provide correction for lateral chromatic aberration or chromatic distortion.

2. The system of claim 1 wherein the projection optical module includes an achromatic doublet comprising a positive lens fabricated from a crown glass, and a negative lens fabricated from a flint glass.

3. The system of claim 1 wherein said wide spectral image source comprises first, second and third distortion correction functions corresponding to said first, second and third colors for electronically compensating said lateral chromatic aberration and chromatic distortion.

4. The system of claim 1 wherein said wide spectral image source comprises a cathode ray tube.

5. The system of claim 1 wherein said wide spectral image source comprises a ferroelectric liquid crystal array.

6. The system of claim 1 wherein said first color is red, said second color is green, and said third color is blue.

7. The system of claim 1 wherein said system is a helmet mounted display, said image source, said color sequential shutter and said projection optical module mounted on a helmet, said helmet mounted display further comprising a visor for reflecting images passed through said projection optical module toward a helmet wearer's eye.

8. A color optical display system with chromatic aberration correction, comprising:

a wide spectral band image source for generating an image for display in response to electronic image signals;

a color sequential shutter responsive to electronic shutter control signals for dividing an image frame period into three sub-frame intervals, a first interval for passing a first color image component comprising the image to be projected, a second interval for passing a second color image component comprising the image to be projected, and a third sub-frame interval for passing a third color image component comprising the image to be projected;

first, second and third distortion correction functions corresponding to said first, second and third colors for electronically compensating lateral chromatic aberration and chromatic distortion of said display system;

a display controller and image generator for generating said electronic image signals and said shutter control signals, said display controller and image generator for mapping first, second and third color components of an image to be displayed into a pre-distorted image, wherein said pre-distortion compensates for lateral chromatic aberration and chromatic distortion of said display system; and a projection optical module adapted to provide correction for longitudinal chromatic aberration, and wherein said projection optical module does not provide correction for lateral chromatic aberration or chromatic distortion.

9. The system of claim 8 wherein the projection optical module includes an achromatic doublet comprising a positive lens fabricated from a crown glass, and a negative lens fabricated from a flint glass.

10. The system of claim 8 wherein said wide spectral image source comprises a cathode ray tube.

11. The system of claim 8 wherein said wide spectral image source comprises a ferroelectric liquid crystal array.

12. The system of claim 8 wherein said first color is red, said second color is green, and said third color is blue.

13. The system of claim 8 wherein said system is a helmet mounted display, said image source, said color sequential shutter and said projection optical module mounted on a helmet, said helmet mounted display further comprising a visor for reflecting images passed through said projection optical module toward a helmet wearer's eye.

* * * * *